March 26, 1929. L. E. WOOLF 1,706,509

LICENCE HOLDER

Filed Feb. 24, 1927

INVENTOR
*Lawrence E. Woolf,*
BY
*Hammond & Littell*
ATTORNEYS

Patented Mar. 26, 1929.

1,706,509

UNITED STATES PATENT OFFICE.

LAWRENCE E. WOOLF, OF WHITE PLAINS, NEW YORK.

LICENSE HOLDER.

Application filed February 24, 1927. Serial No. 170,462.

This invention relates to improvements in supports for removably attaching license tags to an automobile and it is an object of this invention to provide means to conveniently and quickly attach or detach a license plate and its permanently attached holder to a vehicle of that class.

In the automotive trade, as new or used automobiles, including trucks and tractors, etc., are moved from place to place under their own motive power, it becomes necessary to frequently attach and detach the so-called "dealers' plates" or "manufacturers' tags", for short periods of time. In other words, in receiving a new car or lot of cars from storage or from a shipping point for example, a dealer or manufacturer will attach a set of license plates and move the car as desired. When the car is again stored, or sold, the licenses must be removed as they are the property of the dealer. This alternate removal and replacement of licenses has been an arduous task and heretofore has involved a needless waste of time and expense.

It is therefore an object of this invention to provide license plate holders which are permanently secured to the license plate and may be quickly and conveniently secured to or removed from the vehicle without the use of tools.

Further objects and advantages of the invention will be apparent from the following description of the drawings which illustrate a form of embodiment of the invention in which Figure 1 is an elevation of a license tag and attached supporting bracket, certain parts being broken away to more clearly illustrate the construction.

Figure 1:
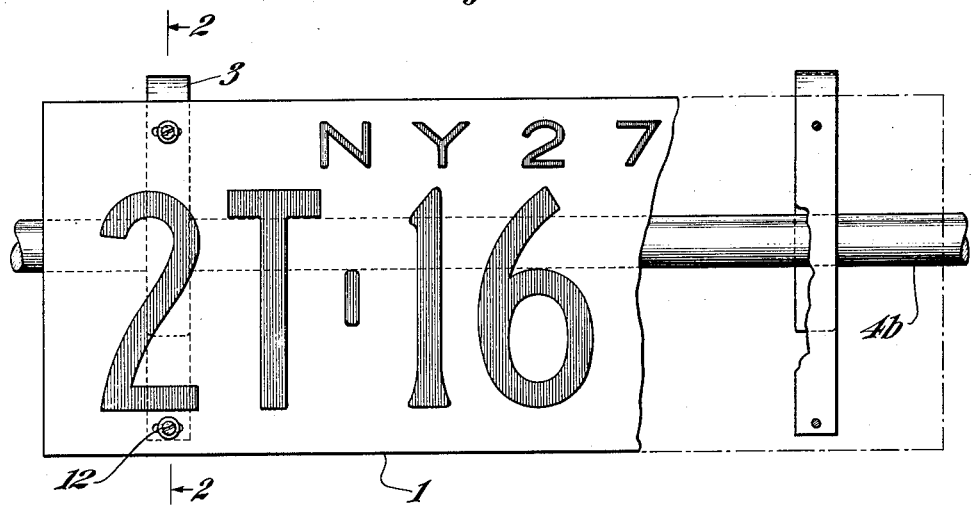
Figure 2:
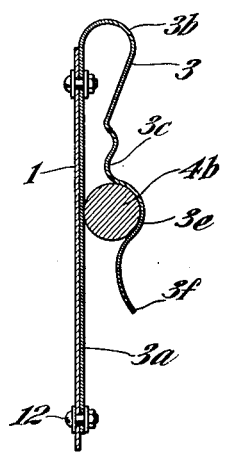
Figure 2 is a vertical section of the attaching means and license support on the line 2—2 of Figure 1.
Figure 3:
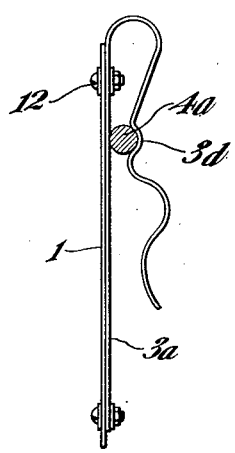
Figure 3 is a view similar to Figure 2 showing a connection to a different sized cross member.

In this construction, the license tag is adapted to be attached to some transverse member of the vehicle such as in front, the tubular cross frame connection or the strut bar between the lamps or any other similar cross arm. If the car were provided with a bumper, it would serve the purpose of a supporting means.

The license tag 1 of any form as prescribed by the State authorities, is permanently attached by screws or bolts 12 or any other preferred means to reversely bent spring bars 3, so arranged that they may be forced over and be supported by the cross arm 4 of whatever type is available. It is to be understood however that the cross arm 4 is suitably attached to the vehicle and will maintain the license in upright position.

The bars 3 are composed of metal strips comprising the portion $3^a$ which is a substantially vertical leg and to which the license tag 1 is attached by the bolts or other devices 12. Near the top of the license tag, the bar 3 is bent back on itself forming a loop or hinge $3^b$ which is of such size and such resilience that the second downwardly extending arm $3^c$ will be resiliently forced against the first portion $3^a$. The second downwardly extending portion $3^c$ has several hump portions $3^d$, to engage a relatively small cross arm, and $3^e$ to engage a larger cross arm. The lip $3^f$ is outwardly bent to allow ready attachment to the cross bar.

It will now be seen that two bars 13 are bolted or otherwise permanently attached to a license tag and that as desired, this license tag is adapted for ready, quick and temporary attachment without trouble, tools, or equipment, to any cross member of a vehicle as desired, and that none of the parts may become separated or lost. It will also be obvious that my invention is susceptible of changes and modification without departing from the principles and spirit thereof, which is to provide a holder permanently secured to the license plate and removably secured to the vehicle, and for this reason I do not wish to be understood as limiting myself to the precise arrangement and formation of the several parts herein shown in carrying out my invention in practice except as hereinafter claimed.

I claim:

1. As an article of manufacture, a vehicle license plate holding member comprising a downwardly projecting leg portion adapted to be permanently secured to the license plate, a second downwardly projecting leg portion having a plurality of curves cooperating with a vehicle cross member, and an intermediate resilient loop between said downwardly projecting portions to force them together and to secure the license tag to the vehicle.

2. In combination with a license plate and a cross member of a motor vehicle adapted to support said license plate, a pair of license plate holders, each adapted to be permanently secured to an end of the license plate, and each comprising an integral U-shaped resilient member, the rear of which has a plurality of curves therein adapted to cooperate with the vehicle cross member, and the front of the U-shaped member being flat and secured to the license plate, the holders being adapted to resiliently and temporarily attach the license tag to the vehicle.

In testimony whereof I have affixed my signature to this specification.

LAWRENCE E. WOOLF.